US007327889B1

(12) United States Patent
Imai et al.

(10) Patent No.: US 7,327,889 B1
(45) Date of Patent: Feb. 5, 2008

(54) IMAGE RECOGNITION APPARATUS

(75) Inventors: Kiyoshi Imai, Kyoto (JP); Mitsuru Matsumura, Kyoto (JP); Yoshitaka Okamoto, Kyoto (JP); Junji Hiraishi, Kyoto (JP)

(73) Assignee: Omron Corporation (JP)

( * ) Notice: Subject to any disclaimer, the term of this patent is extended or adjusted under 35 U.S.C. 154(b) by 513 days.

(21) Appl. No.: 10/089,721

(22) PCT Filed: Oct. 3, 2000

(86) PCT No.: PCT/JP00/06885

§ 371 (c)(1),
(2), (4) Date: Jun. 28, 2002

(87) PCT Pub. No.: WO01/26357

PCT Pub. Date: Apr. 12, 2001

(30) Foreign Application Priority Data

Oct. 6, 1999 (JP) ................................ 11-285132

(51) Int. Cl.
*G06K 9/68* (2006.01)

(52) U.S. Cl. ...................................... 382/218; 399/366

(58) Field of Classification Search ................ 382/135, 382/137, 181, 209, 217, 218; 358/404, 444; 399/366

See application file for complete search history.

(56) References Cited

U.S. PATENT DOCUMENTS 4,578,770 A * 3/1986 Mitani ........................ 364/571
5,055,834 A * 10/1991 Chiba .................... 340/825.34
5,652,803 A * 7/1997 Tachikawa et al. ......... 382/135
5,771,315 A * 6/1998 Matsuyama ................. 382/191
6,256,407 B1 * 7/2001 Mennie et al. .............. 382/135

FOREIGN PATENT DOCUMENTS

JP 6-60165 A 3/1994
JP 8-195880 A 7/1996
JP 8-204955 A 8/1996

OTHER PUBLICATIONS

Microsoft Press Computer Dictionary, Third Edition, 1997, pp. 447, 449.*

* cited by examiner

*Primary Examiner*—Andrew W. Johns
(74) *Attorney, Agent, or Firm*—Dickstein Shapiro LLP

(57) ABSTRACT

An image processing portion (1) performs binarization, segmentation, and feature extraction of a received image using a RAM (2), compares the extracted feature with specific pattern data stored in a dictionary data memory (3), performs recognition processing, and provides recognition results to a CPU (4). The dictionary data memory is a volatile memory, in which specific pattern data held by the CPU is written by the CPU when power is turned on. Since the data stored in the volatile memory is erased when power is turned off, the dictionary data memory can be removed and the contents are analyzed when the power is turned off without causing any trouble.

7 Claims, 9 Drawing Sheets

IMAGE RECOGNITION APPARATUS

TECHNICAL FIELD

The present invention is related to an image recognition apparatus. In particular, the present invention is related to an image recognition (hereinbelow, referred to simply as a "recognition apparatus") apparatus for recognizing whether or not image data of a processing object includes a specific image in an image processing apparatus, image forming apparatus, image reading apparatus or the like.

PRIOR ART TECHNOLOGY

In prior art image processing systems for opposing the counterfeiting of banknotes, valuable securities and the like, various devices have been proposed and implemented in closed systems, such as color copying machines, from image input to image formation. Further, with the advent of high-performance, low-cost image reading devices such as image scanners and the like, image processing devices such as personal computers and the like, and image forming devices such as printers and the like in recent years, counterfeiting on open systems has become a social problem, and various research has been carried out on counter measures to this.

In either case, the basic image recognition process is constructed so that acquired image data (input data) is processed by an image data processing portion (feature extracting portion), the image data outputted by the image data processing portion and a specific pattern stored in advance in a nonvolatile memory are compared, and the recognition results are outputted to a control portion.

However, in such prior art image recognition system, because the specific pattern data is normally stored in a nonvolatile memory, there is the risk that this nonvolatile memory will be analyzed to know which portion inside the image data of the recognition object forms the specific pattern. Then, when the specific pattern is known, there is the risk that counterfeiting will be carried out by executing a copying process in a state where an alteration is added to the original image data to prevent recognition by the recognition device. Further, there is also the risk that an alteration will be carried out on the nonvolatile memory to make the normal recognition process itself impossible.

The analysis and alteration described above form a particularly big problem for the field of highly confidential recognition, for example, the recognition of documents prohibiting illegal copying (banknotes, securities, etc.), and the field of specific personal recognition (fingerprint checking, handwriting comparison, voice recognition, etc.).

Further, in the case of a structure where the specific pattern data is stored in a nonvolatile memory, there is the problem that it is difficult to update the specific pattern data. Namely, in the case where an alteration or addition is made to a recognition object such as a banknote or the like, an updating needs to be carried out to match the specific pattern data with this, but in order to carry out this updating, the recognition device itself needs to be withdrawn and taken back to a factory or the like to carry out an operation to replace the old nonvolatile memory with a nonvolatile memory storing the new specific pattern data, and this requires an enormous amount of time and expense. Furthermore, because the system is in a state where the recognition process can not be carried out during the replacement operation, it is not possible to put the recognition process to practical use.

It is an object of the present invention to provide an image recognition apparatus which makes it difficult to carry out analysis and alternation, and which makes it easy to update specific pattern data.

SUMMARY OF THE INVENTION

The image recognition apparatus according to the present invention is a recognition apparatus equipped with an image recognition apparatus for preventing counterfeiting of bank notes and valuable securities, and is equipped with a recognition processing portion which carries out a recognition process on supplied image data using dictionary data stored in a storage portion to determine whether or not said supplied image matches said dictionary data, and means for writing said dictionary data stored in said storage portion is erased at least at the time when the power is not on.

In this way, because the proper dictionary data for carrying out the recognition process is not stored in the storage portion when the power is not on, even when the memory is removed to analyze the contents while the power is in an off state, it will be impossible to carry out analysis of the contents of the dictionary data. Further, because of the risk of damage to the entire apparatus, it is normally not possible to remove the memory while the power is in an on state. Accordingly, the risk of analysis and alteration is suppressed.

The recognition apparatus may be constructed so that said storage portion is constructed from a volatile memory, wherein the erasing of said dictionary data is carried out automatically in accordance with the cutting off of the power supply. As it is well known, because a volatile memory holds the stored contents thereof only while power is being supplied, the dictionary data stored in the volatile memory automatically disappears when the power is turned off. Accordingly, there is no particular need to provide erasing means.

Further, said storage portion may be constructed from a rewriteable memory, and the recognition apparatus may be provided with means for erasing said dictionary data stored in said storage portion at a prescribed timing. By providing erasing means, it becomes possible to use a rewriteable memory as a type of memory used for the storage portion, and this widens the range of choices. Further, as for the timing of the erasing of the dictionary data, the dictionary data may be erased when the power is cut off (turned off), or when the recognition process is terminated. Further, so long as there is no obstacle to the recognition process, it is possible to employ any timing during the interval from after the power is turned on until the power is turned off. Of course, it is also possible to write in the dictionary data again after erasing has been carried out once. Further, in the case where a rewriteable memory is used, it is possible to store dummy dictionary data in the storage portion when the power is turned off. In this way, it is possible to supply wrong information to people who try to analyze the dictionary data to carry out counterfeiting, and this makes it possible to suppress the risk of counterfeiting as much as possible.

Furthermore, the recognition apparatus may be equipped with means for monitoring the connection status of said storage portion. By monitoring the connection status during operations (when the power is on), it is possible to carry out a check of whether or not there is an improper act such as the removal or replacement of the storage portion or the like, and this makes it possible to carry out the recognition process correctly. Then, in the case where there is an improper act, by giving notice of such fact, and by stopping the function of the apparatus body provided with the recognition apparatus, for example, it is possible to prevent counterfeiting and the like,

PREFERRED EMBODIMENTS OF THE INVENTION

The present invention will be described in greater detail with reference to the appended drawings.

Figure 1:
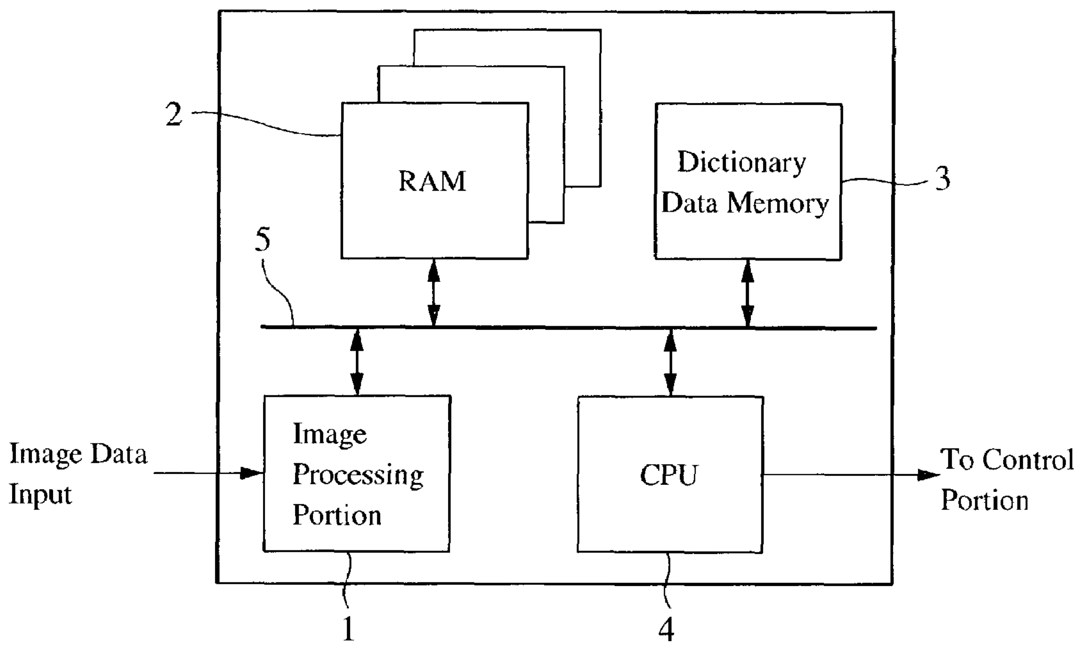
FIG. 1 is a block diagram showing a preferred embodiment of a recognition apparatus according to the present invention.

FIG. 1 shows a preferred embodiment of a recognition apparatus according to the present invention. As shown in this drawing, image data of a recognition object is supplied to an image processing portion 1. The image processing portion 1 carries out binarization, segmentation, and feature extraction of the received image using a RAM (SRAM, DRAM, etc.) 2. Then, the image processing portion 1 compares the extracted feature quantity and specific pattern data stored in a dictionary data memory 3, calculates the similarity level (matchability), and supplies such calculated recognition results to a CPU 4. Now, each of these portions is connected to a database 5 to enable the transmission and reception of data.

The CPU 4 outputs the received recognition results to a control portion outside the drawings, and a prescribed process for prohibiting copying and the like is carried out in the control portion. Namely, in the case where this recognition apparatus is provided in a copy machine or image forming apparatus, when the recognition result is "specific pattern is detected", the normal copying process or printing process is prohibited by outputting an image with a lowered resolution, painting over the image, or the like. Further, in the case where the recognition apparatus is provided in an image reading apparatus, storage can be carried out after conversion to image data having a lowered resolution, or storage can be carried out in correlation with information indicating that the image is a prohibited output item, or other various techniques can be employed. Because the structure and the process described above are the same as those of the prior art, a detailed description thereof is omitted.

Figure 2:
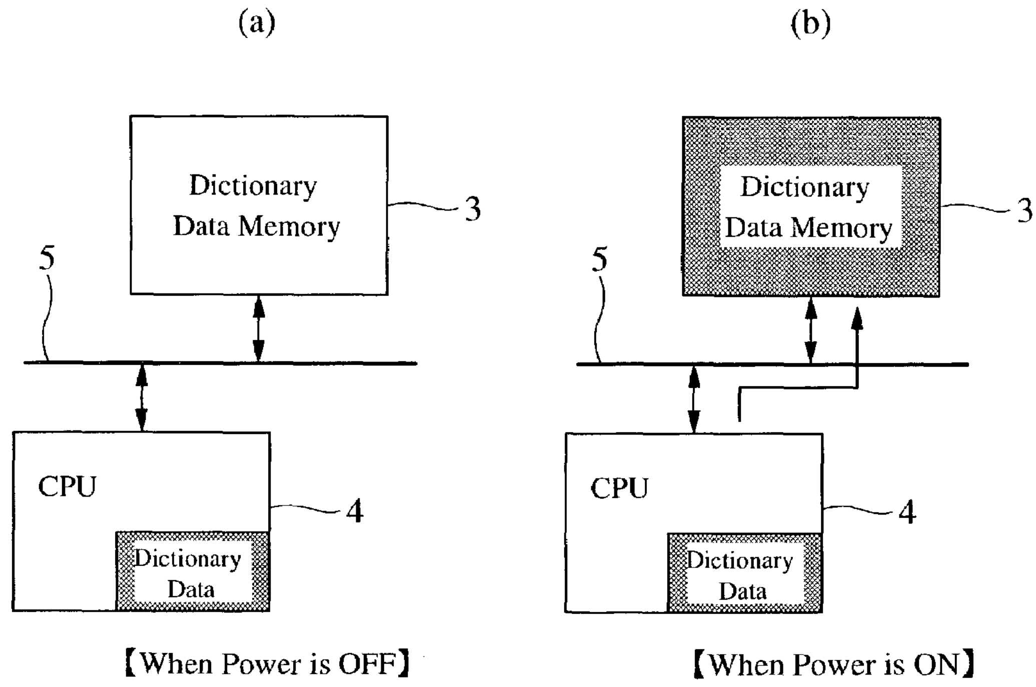
FIG. 2 is a drawing for describing the operating principle of an essential portion.

Now, in the present invention, the dictionary data memory 3 is constructed using a volatile memory. Further, as for the function of the CPU 4, as shown in FIG. 2, when the power is turned off, the CPU 4 holds the dictionary data (specific pattern data) (see FIG. 2(*a*)), and after the power is turned on, the CPU 4 writes the held dictionary data into the dictionary data memory 3 (see FIG. 2(*b*)).

Figure 3:
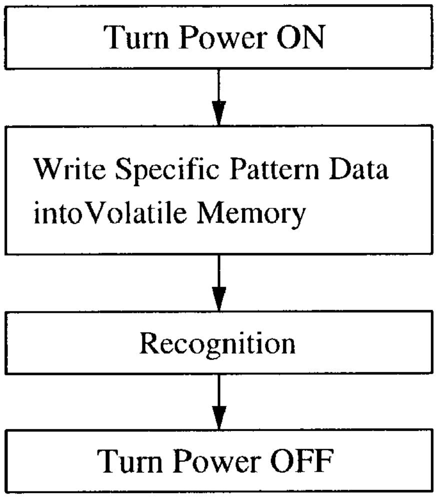
FIG. 3 is a flowchart for describing the operation of the first embodiment.

In this way, during operations, the dictionary data stored in the dictionary data memory 3 is used to make it possible to carry out highly accurate measurements in the image processing portion 1. Then, when the power is turned off, the specific pattern data is automatically erased (eliminated) from the dictionary data memory 3 which is a volatile memory. Now, the flow of this process is illustrated by the flowchart shown in FIG. 3.

Furthermore, when the dictionary data is stored in the CPU 4, the data may be stored as is, or the data may be stored in a compressed or encrypted state. Because the CPU 4 does the storing, there is little possibility of analysis being carried out even when the data is stored as is, but by storing compressed data, there is even more improvement of security.

Figure 4:
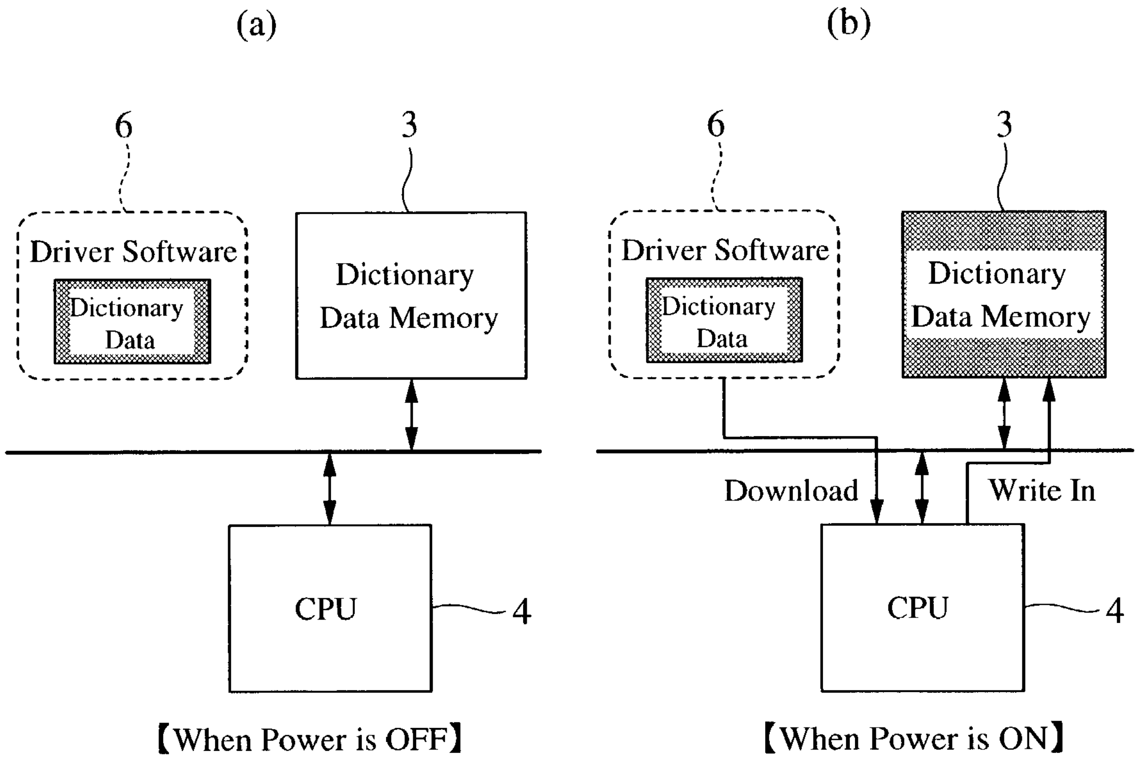
FIG. 4 is a drawing showing a modification example.

Further, in the embodiment described above, the dictionary data is held inside the CPU 4, but the present invention is not limited to this. In another example shown in FIG. 4, when the power is turned off, the dictionary data (specific pattern data) is held in a driver software 6 (see FIG. 4(*a*)), and as shown in FIG. 4(*b*), after the power is turned on, or after the software is run, the specific pattern data is downloaded into the CPU 4 from the driver software 6. Then, after downloading (data transfer) is completed, or during data transfer, the specific pattern data may be written into the dictionary data memory 3 from the CPU 4.

Also in this case, because the specific pattern data is held in storage inside the dictionary data memory 3 while the power is on, a normal recognition process can be carried out, and because the information stored inside the dictionary data memory 3 which is a volatile memory disappears at the same time the power is turned off, it becomes impossible to analyze the memory contents when the power is off.

Further, as for the form in which the data is held when the power is off, in addition to those forms described above, the data may also be held as a data file. Furthermore, as for the data holding method, the data may be held as is, the data may be compressed, or of course the data may be encrypted.

Figure 5:
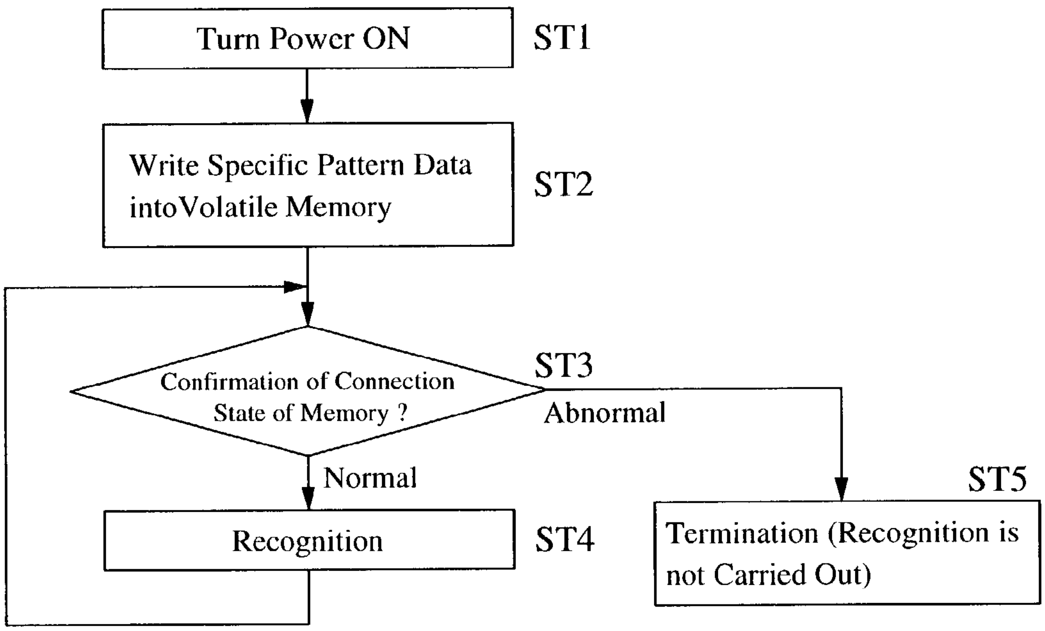
FIG. 5 is a flowchart showing the function of the CPU that forms an essential portion of the second embodiment.

FIG. 5 shows the function of the CPU 4 which is an essential portion of the second embodiment of the present invention. Namely, in the first embodiment, the CPU 4 carries out only a process to write the specific pattern data into the dictionary data memory 3, but in the present embodiment, after the power is turned on, the specific pattern data is written into the dictionary data memory 3 (volatile memory) (ST1, ST2), and then the connection state of the memory is confirmed at a prescribed timing (ST3). As for the specific technique of confirming the connection state, a general verifying check may be carried out for example. Further, the prescribed timing may be applied either during the recognition process, or during standby when the recognition process is not being carried out.

Then, in the case where it is confirmed that the dictionary data memory 3 is in a normal connection state, because it can be assumed that the normal recognition process stored in the dictionary data memory 3 can be carried out, a regular recognition process is carried out (ST4). On the other hand, when an abnormality is detected, the process is terminated, and the fact that an abnormality has been detected is outputted to a control portion outside the drawings (ST5).

By having such structure, even when, for example, alterations are made to the dictionary data memory 3, the dictionary data memory 3 itself is removed, or replacements are made to other elements while the power is on, it is possible to detect such abnormal state. Accordingly, in the case where such abnormality is detected, because a normal recognition can not be carried out, it is possible to reliably prevent counterfeiting and the like by having the actual apparatus of the copying process, image reading, image formation or the like not carry out the image processing itself.

Figure 6:
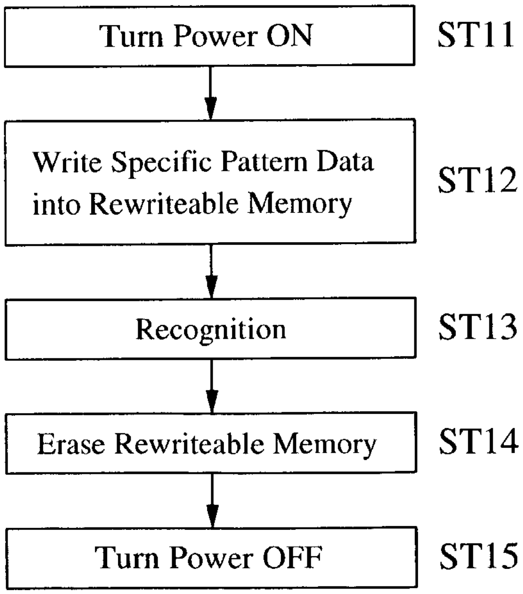
FIG. 6 is a flowchart showing the function of the CPU that forms an essential portion of the third embodiment.

FIG. 6 shows the function of the CPU 4 which is an essential portion of the third embodiment of the present invention. Namely, in each of the embodiments described above, a volatile memory was used for the dictionary data memory 3, but in the present embodiment, a rewriteable memory is used.

Namely, in the power off state, dictionary data (specific pattern data) is held in the CPU 4 or a device driver 6, and when the power is turned on, the specific pattern data is written into the dictionary data memory (nonvolatile memory) (ST11, ST12). Next, a recognition process is carried out based on the specific pattern data that was written in (ST13).

Then, when the CPU 4 receives a power off signal, the CPU 4 erases the contents of the dictionary data memory 3 (ST14). In this way, by actively erasing the stored information of the dictionary data memory 3 when the power is turned off, because data is erased and does not exist in memory when the power is turned off, this has a strong effect against analysis and alteration.

Thereafter, the power is turned off (ST15). In this case, because the memory is erased during the interval from when the power switch is turned off until the power is actually cut off, a delay circuit or capacitor is provided in the power circuit, and time for the erasing time portion is secured. Further, the erasing of the specific pattern data is not limited to the time when the power is turned off as described above, and in the case where recognition is carried out by software for example, the erasing of the dictionary data memory 3 may be carried out at the point in time when the software is terminated. Further, instead of simply erasing the specific pattern data when the power is turned off or the like, dummy data may also be stored. By storing dummy data in this way, no problem will occur even when the memory contents are analyzed.

Figure 7:
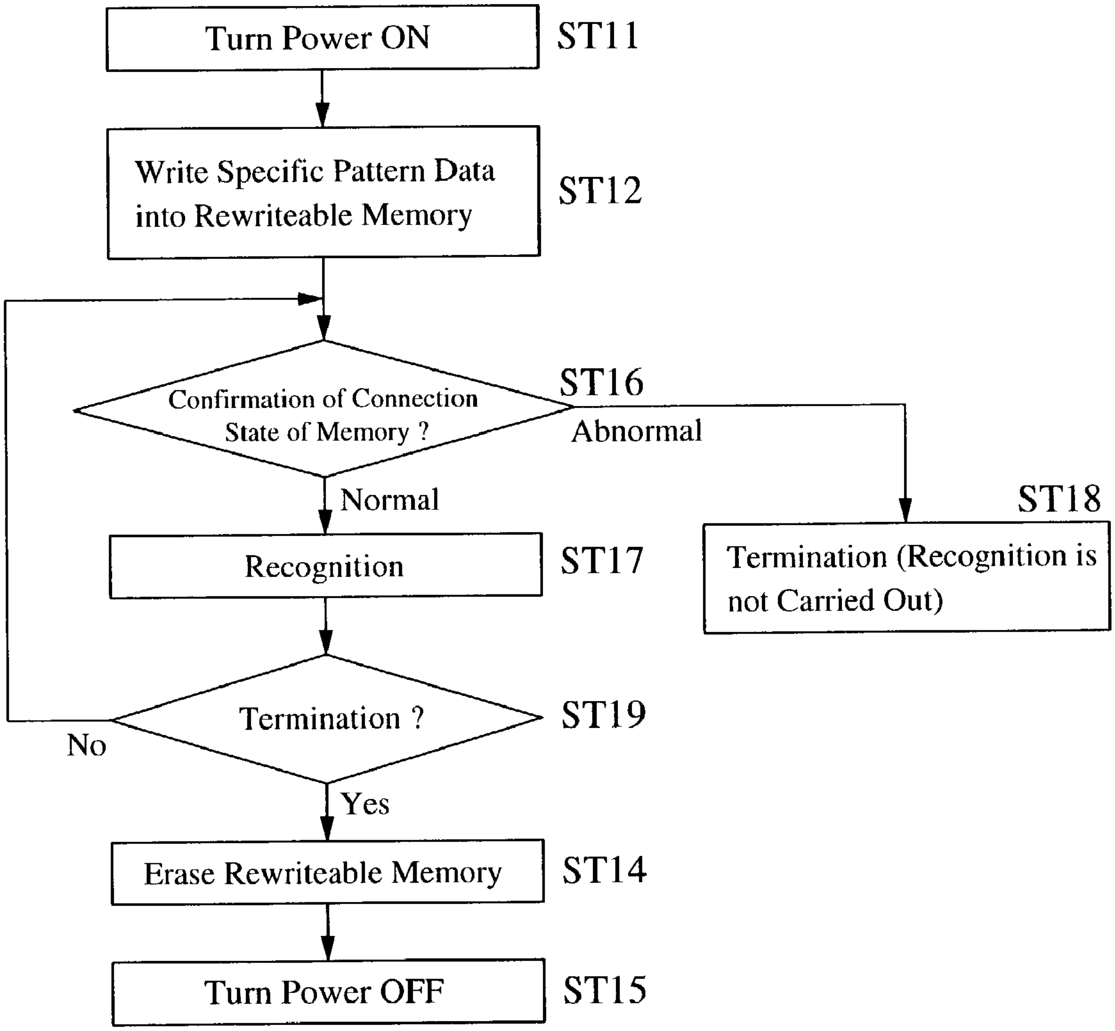
FIG. 7 is a flowchart showing the function of the CPU that forms a modification example of the third embodiment.

Moreover, even in this type of arrangement which uses a rewriteable memory as the dictionary data memory, using the second embodiment as a base, as shown in FIG. 7, after the specific pattern data is written into the dictionary data memory 3 in accordance with the power being turned on (ST11, ST12), a confirmation of the connection state of the dictionary data memory 3 may be carried out (ST16), and then a determination of whether or not the recognition process will be executed may be carried out based on the confirmation results (ST17, ST18).

Figure 8:
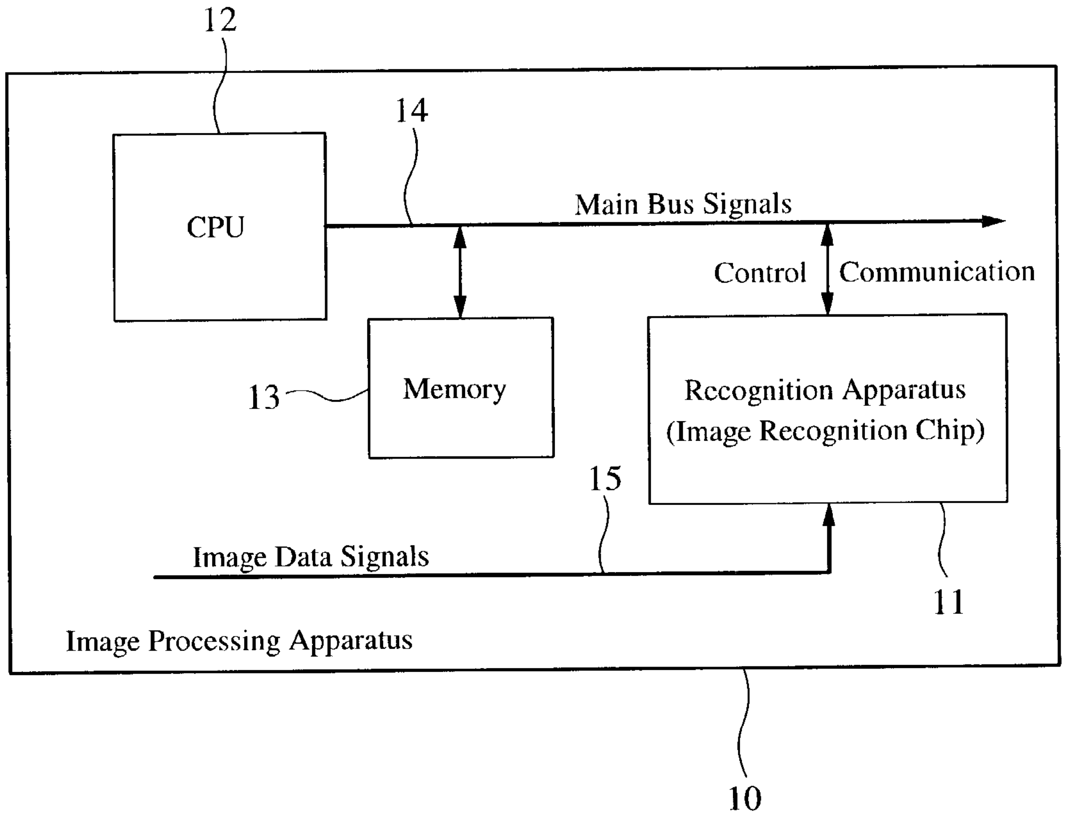
FIG. 8 is a block diagram showing an image processing apparatus provided with the recognition apparatus of the fourth embodiment.

FIG. 8 shows a fourth embodiment of the present invention. In each of the embodiments described above, examples applied to open systems which use a personal computer or the like were described. However, the present invention is not limited to such open systems, and it is possible to also apply the present invention to closed systems such as copy machines and the like.

Furthermore, prior art counterfeit prevention apparatuses have been supplied as a substrate, but in accordance with the high integration, lowered price and the like of integrated circuits in recent years, it has become possible to achieve this with one integrated circuit. Further, a high-performance central processing unit has also begun to be provided in the system of the body equipped with the counterfeit prevention apparatus. In this regard, in the prior art, even the recognition apparatus which was achieved by providing various components such as a central processing unit, an integrated circuit for counterfeit prevention, a dictionary memory and the like on a substrate can be achieved by one integrated circuit.

In this regard, in this fourth embodiment, a recognition apparatus 11 constructed from one integrated circuit is provided inside an image processing apparatus 10 such as a color copy machine or the like. As shown in FIG. 8, a memory 13 and a central processing unit 12 for executing the basic functions of the image processing apparatus 10 which is a color copy machine, color printer or the like are connected by a main bus 14. Further, in the drawing, only one central processing unit 12 and only one memory 13 are shown, but a plurality of these may be provided.

The recognition apparatus 11 of the present invention is connected as one peripheral apparatus which depends on the one main bus 14. Namely, the recognition apparatus 11 is connected to the main bus 14, and the transmission and reception of data between the recognition apparatus 11 and the central processing unit 12 and the control of the recognition apparatus 11 are carried out through the main bus 14. Then, the image signals that should undergo recognition by the recognition apparatus 111 are supplied by an image data bus 15.

Figure 9:
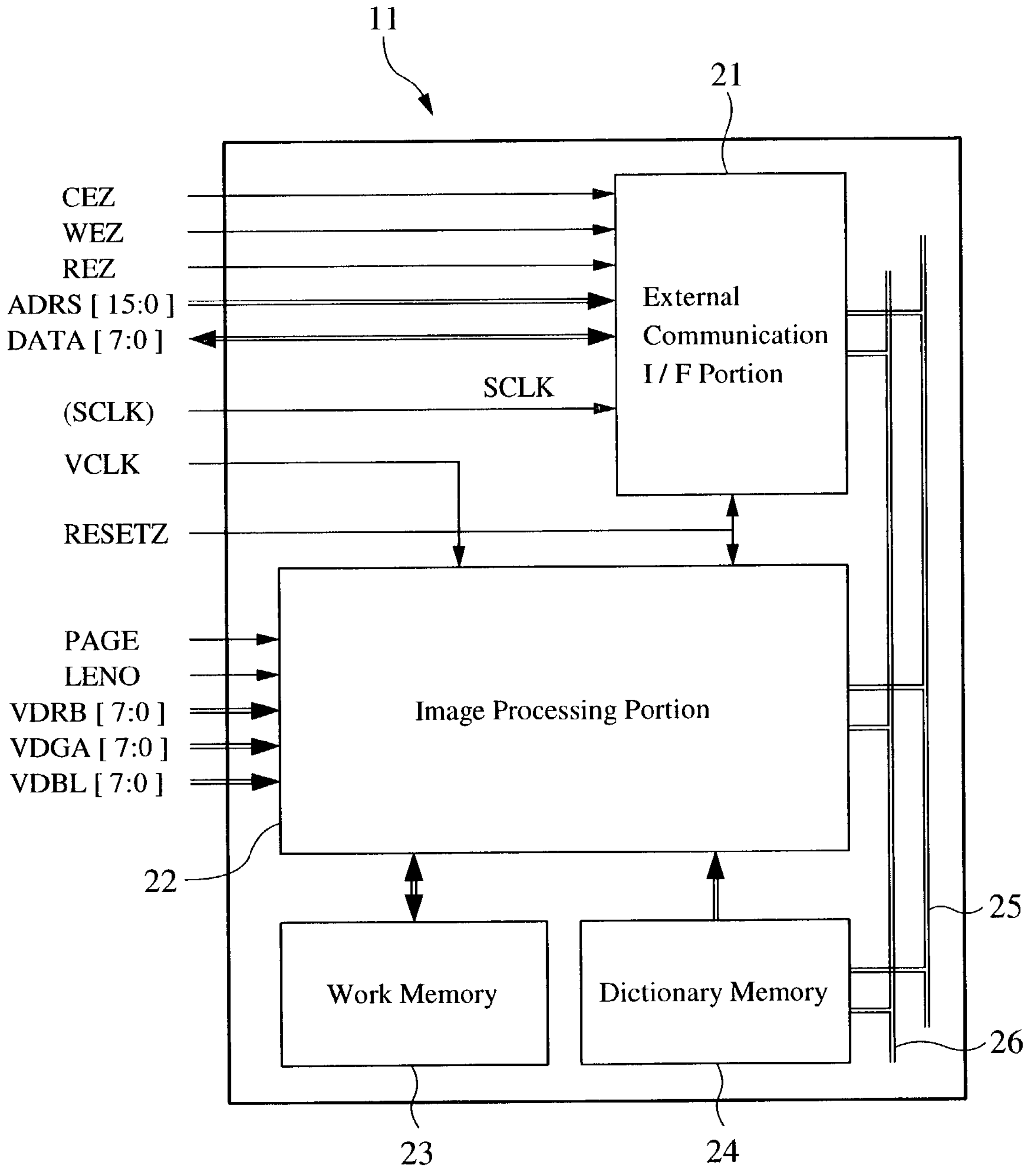
FIG. 9 is a block diagram showing the fourth embodiment.

FIG. 9 shows one example of the internal structure of the recognition apparatus 11. This recognition apparatus 11 is integrally formed with one LSI, and is connected in an SRAM manner viewed from the image processing apparatus body which is a copy machine, printer or the like. Namely, various parameters and commands for carrying out the recognition process are written into a register of an external communication interface (I/F) portion 21, and the operation status and the recognition results carried out by a recognition processing portion 22 stored in the register of the external interface portion 21 are read out. The image processing apparatus body (central processing unit 12) controls operations based on these read out recognition results. Further, the communication partner is not limited to a central processing unit, and may be a signal processor or the like.

Specifically, with a chip select CEZ on, when both a write enable WEZ and a read enable REZ are turned on, the reading and writing of data for the storage region of the register specified by the address designated by an address bus ADRES (16 bits) are carried out through a data bus DATA (8 bits).

Figure 10:
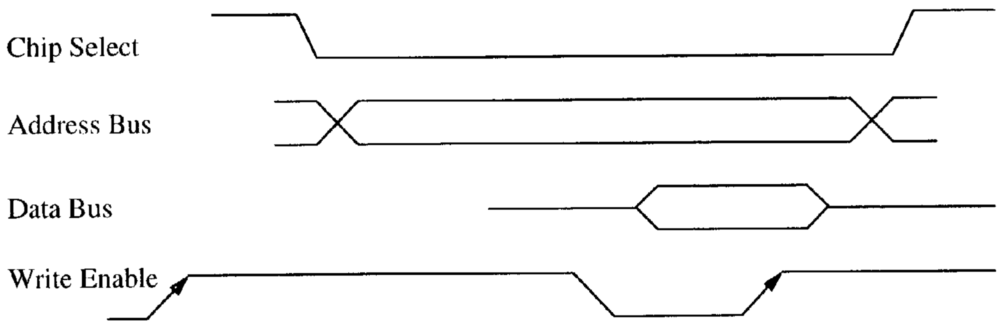
FIG. 10 is a timing chart showing the writing in of data.
Figure 11:
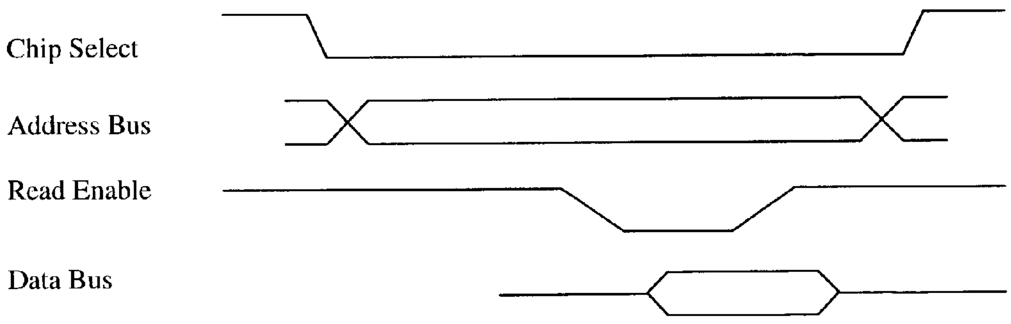
FIG. 11 is a timing chart showing the reading out of data.

The form of communication is the same as the general communication with the central processing unit, and is carried out, for example, by the timing charts shown in FIG. 10 and FIG. 11. Namely, as shown in FIG. 10, when the chip select and the write enable are on (Low), the data sent in from the data bus is written into the storage region designated by the address bus. Further, as shown in FIG. 1, when the chip select and the read enable are on (Low), the data stored in the storage region designated by the address bus is read out through the data bus and supplied to the central processing unit 12 through the main bus.

Further, a data input/output clock SCLK and an image synchronizing clock VCLK are provided in the recognition apparatus 11. Then, the data input/output clock SCLK forms the system clock which controls the external communication interface portion 21, and the writing in/reading out of data described above is carried out while synchronized with the system clock.

Furthermore, in the present example, the data input/output clock SCLK and the image synchronizing clock VCLK are described by separate names, but the image synchronizing clock VCLK is a clock for regular input, and so long as the frequency does not have an effect on the performance of the central processing unit 12 of the image processing apparatus 10, the same clock may be used.

On the other hand, inside the recognition apparatus 11, the image processing portion 22 is provided, various parameters (threshold values and the like) required for the image process are received from the external communication interface portion 21, and the recognition results are stored in a prescribed storage region of the external communication interface portion 21.

The transmission and reception of such data are carried out through a data bus 25 and an address bus 26. Further, the image data of the recognition object is supplied by three input terminals (8 bits each). Namely, a VDRB terminal, a VDGA terminal and a VDBL terminal form the three input terminals which construct an input portion.

Figure 12:
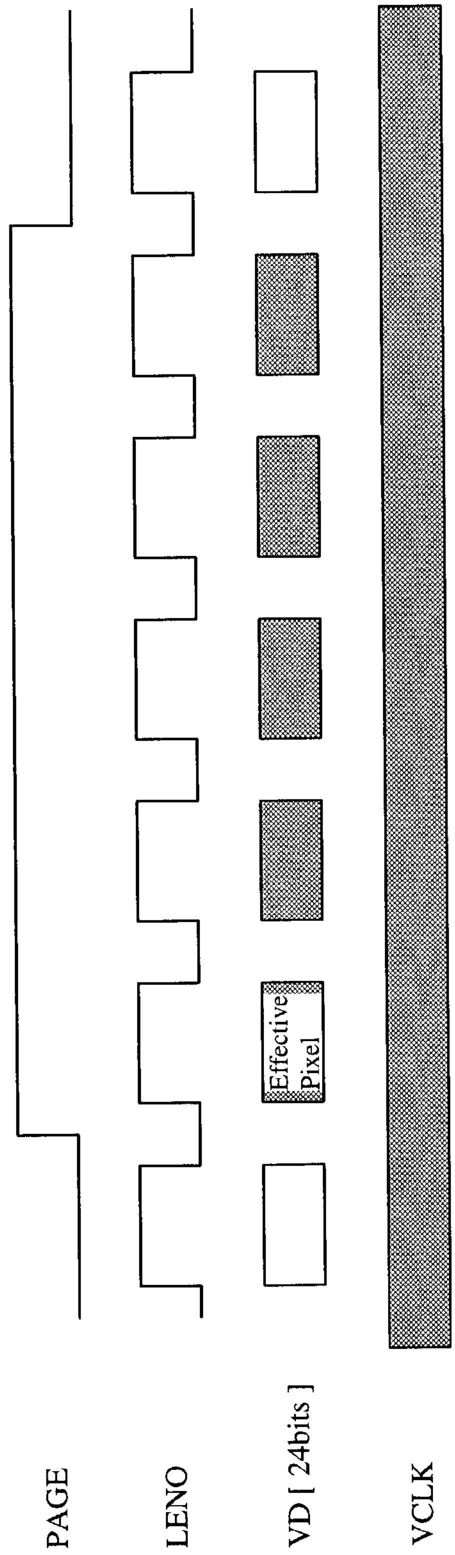
FIG. 12 is a timing chart showing the input of image data.
Figure 13:
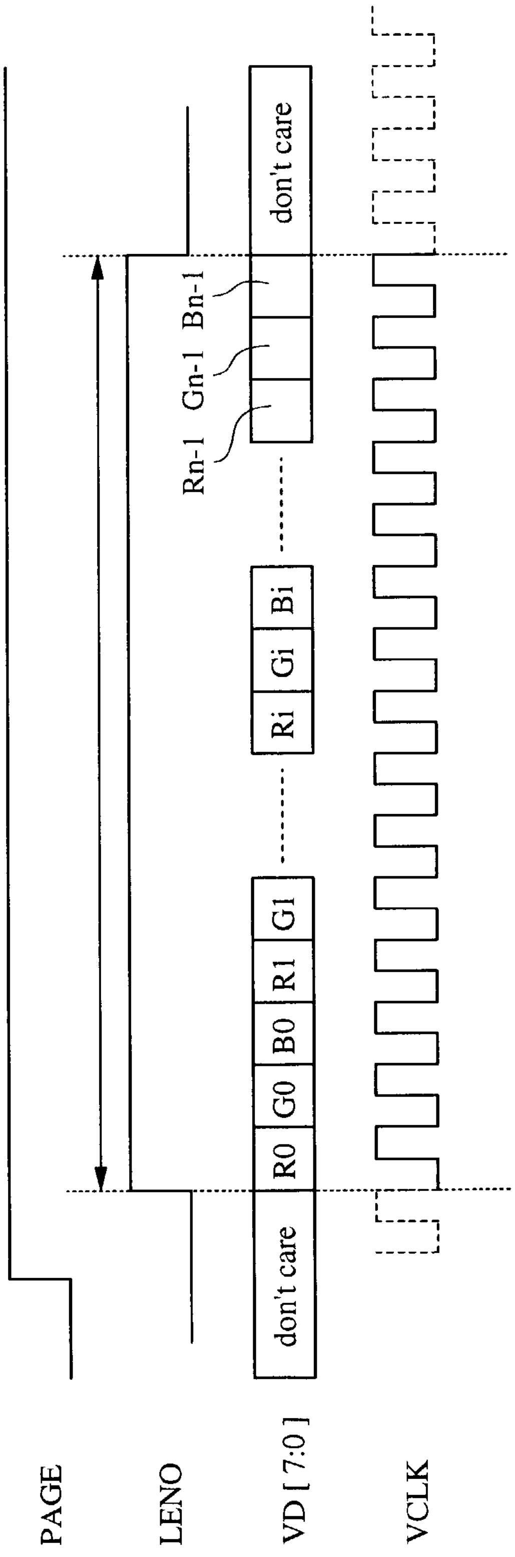
FIG. 13 is a timing chart showing the input of image data.

Then, the input of these image data signals is carried out, for example, by the timings shown in FIG. 12 and FIG. 13. Namely, as shown in FIG. 12, when a vertical scanning effective interval signal PAGE and a horizontal scanning effective interval signal LENO are on (High), the image data is inputted into the image processing portion 22 from the input terminals VD of the RGB image signals by pixel units in an ordered manner in accordance with a raster method. As for the input of image data for one effective pixel, as shown in FIG. 13, data (R1) from the terminal VDRB, data (Gi) from the terminal VDGA, and data (Bi) from the terminal VDBL are inputted in an ordered manner. Now, because this input method is the same as that of the prior art, a detailed description thereof is omitted. Further, in the present example, a description was given for the three color components of RGB, but it is also possible to use four input terminals of 8 bits each in four color components such as RGB α, YMCK or the like.

Then, while using a work memory 23 which is a temporary storage portion, the image processing portion 22 carries out an image recognition process on the received image data based on a recognition algorithm stored in a dictionary memory 24, and the recognition results thereof are stored in the external communication interface portion 21. Namely, an image process is carried out on the received image data, and recognition is executed by collating the image process results with a dictionary stored in the dictionary memory 24.

In prior art image recognition apparatuses, the dictionary memory 24 was constructed by a nonvolatile memory (flash ROM, PROM, mask ROM or the like). In contrast with this, in the present embodiment, the dictionary memory 24 is constructed using an SRAM. Further, in addition to an SRAM, it is also possible to use a register represented by a flip flop or D-latch or the like, a DRAM or the like. All of these use a volatile storage medium which does not hold data when the power is turned off.

In this way, because the dictionary memory 24 is volatile, dictionary data needs to be established after the power is turned on. In this regard, the dictionary data is supplied to the external communication interface portion 21 of the recognition apparatus 11 from the central processing unit 12 of the image processing apparatus 10 through the main bus 14. Then, the dictionary data supplied to the external communication interface portion 21 through the data bus 25 and the address bus 26 inside the recognition apparatus 11 is stored in a prescribed storage area of the dictionary memory 24.

In this way, in the same manner as each of the embodiments described above, because the dictionary data inside the dictionary memory 24 is erased when the power is turned off, it is not possible to steal such dictionary data. Namely, even if the recognition apparatus (recognition chip) 11 is removed and analyzed, it is impossible to remove data stored in the volatile memory. Then, after the power is turned on, because dictionary data is established inside the dictionary memory 24, the recognition process can be carried out correctly.

As described above, the external communication interface portion 21 is equipped with a function to download dictionary data to the recognition apparatus 11 from the image processing apparatus 10 which is the base system, and store such dictionary data in the dictionary memory 24 via the buses 25 and 26 inside the recognition apparatus 11. Further, the recognition apparatus 11 receives control of the recognition start/termination and the like from the image processing apparatus 10. Further, in the case where the image processing apparatus 10 is equipped with a variable size process function of a color copy machine, color printer or the like, there is also a function which receives the variable size ratio from the image processing apparatus 10, and transfers such variable size ratio to the image processing portion 22. The image processing portion 22 which receives this variable size ratio information carries out a variable size process on the received image data or the dictionary data in accordance with the variable size ratio, and by establishing the same variable size ratio for the two images that will be compared, it is possible to carry out a recognition process having good accuracy. Further, the recognition results carried out by the recognition apparatus 11 and the status and the like during recognition, detection or the like are stored, and utilization is carried out when the image processing apparatus 10 reads out such stored contents.

Further, in this fourth embodiment, the recognition apparatus 11 is constructed inside one integrated circuit, but by partitioning each block or the like, it is of course also possible to construct the recognition apparatus 11 by a plurality of integrated circuits.

INDUSTRIAL APPLICATION

In the recognition apparatus according to the present invention, because the specific pattern data (dictionary data) is written into a volatile memory or a rewriteable memory when the apparatus is operated, and because the stored contents are erased when operations are terminated, even when the memory is removed to analyze the contents while the power is in an off state, it will be impossible to carry out analysis because there is no information written in the memory. Further, the removing of the memory while the power is in an on state is impossible because of the risk of electrical damage to the entire apparatus, and there is no loss of the function of a recognition apparatus. Further, by rewriting the driver, for example, it is possible to carry out updating with the newest dictionary data without having to replace the memory components.

The invention claimed is:

1. An image recognition apparatus for preventing counterfeiting of bank notes and valuable securities, comprising:

means for writing external dictionary data into a storage portion of a volatile memory; and a recognition processing portion which carries out a recognition process on supplied image data using said dictionary data stored in said storage portion of said volatile memory to determine whether or not said supplied image matches said dictionary data, wherein said dictionary data stored in said storage portion is erased from said volatile memory at least at the time when the power is not on and said dictionary data is provided from an external source to said image recognition apparatus.

2. The image recognition apparatus of claim 1, wherein the erasing of said dictionary data is carried out automatically in accordance with the cutting off of the power supply.

3. An image recognition apparatus for preventing counterfeiting of bank notes and valuable securities, comprising:

a recognition processing portion which carries out a recognition process on supplied image data using dictionary data stored in a storage portion to determine whether or not said supplied image matches said dictionary data; and means for writing said dictionary data into said storage portion;

wherein said storage portion is constructed from a rewriteable memory, and further comprising means for actively rewriting said dictionary data stored in said storage portion in response to a termination signal.

4. The image recognition apparatus of any one of claim 1 through claim 3, further comprising means for monitoring the connection status of said storage portion.

5. An image processing apparatus, comprising:

an image recognition apparatus comprising:

means for writing external dictionary data into a storage portion of a memory; and a recognition processing portion which carries out a recognition process on supplied image data using said dictionary data stored in said storage portion of said memory to determine whether or not said supplied image matches said dictionary data, wherein said dictionary data stored in said storage portion is erased from said memory at least at the time when the power is not on and said dictionary data is provided by an external source to said image recognition apparatus; and means for performing a copy-prohibiting process when a determination of a copy-prohibited object is made based on an output from said image recognition apparatus.

6. The image processing apparatus of claim 5, wherein said storage portion is constructed from a volatile memory, and wherein the erasing of said dictionary data is carried out automatically in accordance with the cutting off of the power supply.

7. An image processing apparatus comprising:

an image recognition apparatus comprising:

a recognition processing portion which carries out a recognition process on supplied image data using dictionary data stored in a storage portion to determine whether or not said supplied image matches said dictionary data; and means for writing said dictionary data into said storage portion;

wherein said storage portion is constructed from a rewriteable memory, and further comprising means for actively rewriting said dictionary data stored in said storage portion in response to a termination signal; and means for performing a copy-prohibiting process when a determination of a copy-prohibited object is made based on an output from said image recognition apparatus.

* * * * *